United States Patent
Klobucar et al.

(10) Patent No.: US 7,972,132 B2
(45) Date of Patent: Jul. 5, 2011

(54) INJECTION MOLDING VALVE GATED HOT RUNNER NOZZLE

(75) Inventors: Peter Klobucar, Georgetown (CA); Denis Babin, Georgetown (CA); Bruce Catoen, Georgetown (CA); Scott Gammon, Toronto (CA)

(73) Assignee: Mold-Masters (2007) Ltd, Georgetown, ON (CA)

( * ) Notice: Subject to any disclaimer, the term of this patent is extended or adjusted under 35 U.S.C. 154(b) by 0 days.

(21) Appl. No.: 12/572,294

(22) Filed: Oct. 2, 2009

(65) Prior Publication Data

US 2010/0092601 A1    Apr. 15, 2010

Related U.S. Application Data

(60) Provisional application No. 61/104,427, filed on Oct. 10, 2008.

(51) Int. Cl.
*B29C 45/23*     (2006.01)

(52) U.S. Cl. .......................... 425/564; 425/566

(58) Field of Classification Search .................. 425/549, 425/564
See application file for complete search history.

(56) References Cited

U.S. PATENT DOCUMENTS

| | | |
|---|---|---|
| 4,043,740 A | 8/1977 | Gellert |
| 4,212,625 A | 7/1980 | Shutt |
| 4,622,001 A | 11/1986 | Bright et al. |
| 5,208,052 A | 5/1993 | Schmidt et al. |
| 5,492,467 A | 2/1996 | Hume et al. |
| 5,554,395 A | 9/1996 | Hume et al. |
| 5,804,228 A | 9/1998 | Kofsman et al. |
| 5,879,727 A | 3/1999 | Puri |
| 6,220,850 B1 * | 4/2001 | Catoen et al. ................. 425/549 |
| 6,245,278 B1 | 6/2001 | Lausenhammer et al. |
| 6,315,549 B1 | 11/2001 | Jenko et al. |
| 6,428,305 B2 | 8/2002 | Jenko |
| 6,533,571 B2 | 3/2003 | Fikani |
| 6,743,009 B1 | 6/2004 | Ramond |
| 6,769,901 B2 | 8/2004 | Babin et al. |
| 6,921,259 B2 | 7/2005 | Sicilia et al. |
| 7,025,585 B2 | 4/2006 | Gellert |
| 7,025,586 B2 | 4/2006 | Fischer et al. |
| 7,037,103 B2 | 5/2006 | Niewels |
| 7,118,703 B2 * | 10/2006 | Trudeau ........................ 425/549 |
| 7,128,566 B2 | 10/2006 | Babin |
| 7,137,807 B2 | 11/2006 | Babin et al. |
| 7,156,651 B2 * | 1/2007 | Niewels ........................ 425/564 |
| 2003/0008034 A1 | 1/2003 | Niewels |

(Continued)

FOREIGN PATENT DOCUMENTS

| | | |
|---|---|---|
| DE | 10037739 | 2/2004 |
| JP | 07148786 | 6/1995 |
| JP | 10202697 | 8/1998 |

(Continued)

*Primary Examiner* — Tim Heitbrink
(74) *Attorney, Agent, or Firm* — Medler Ferro PLLC (57) ABSTRACT

A valve gated hot runner nozzle with at least two transition members made of different materials located between a nozzle tip and a mold gate component to provide a thermal transition region. A first transition member in contact with the nozzle tip is less thermally conductive than a second transition member in contact with the mold gate component. The valve pin when in the closed position makes sealing contact with at least the second transition member such that cooling from the mold gate component is transferred to the valve pin to cool the melt in the mold gate area.

20 Claims, 9 Drawing Sheets

| U.S. PATENT DOCUMENTS | | | FOREIGN PATENT DOCUMENTS | | |
|---|---|---|---|---|---|
| 2004/0208949 A1 | 10/2004 | Joachim | JP | 10296798 | 11/1998 |
| 2004/0234646 A1 | 11/2004 | Benenati | JP | 2005335194 | 12/2005 |
| 2005/0045746 A1 | 3/2005 | Blais | KR | 20000054693 | 9/2000 |
| 2006/0182843 A1 | 8/2006 | Fischer et al. | * cited by examiner | | |

INJECTION MOLDING VALVE GATED HOT RUNNER NOZZLE

CROSS REFERENCE TO RELATED APPLICATION

This application claims the benefit under 35 U.S.C. §119 (e) of U.S. Appl. No. 61/104,427 filed Oct. 10, 2008, which is incorporated by reference herein in its entirety.

FIELD OF THE INVENTION

The present invention relates to injection molding and more particularly to a valve gated nozzle for a hot runner system.

BACKGROUND OF THE INVENTION

In injection molding and in particular hot runner molds for injection molding managing the thermal transition at the mold gate between the hot runner side and the cold cavity side of the mold is a challenge.

In valve gated hot runner nozzles when the valve pin is seated in the mold gate in a closed position, the valve pin conducts heat from the molten material in the nozzle melt channel to the area of the mold gate. Such heat transfer makes it difficult to cool the mold gate area. Further, if the molded part is ejected before adequate cooling is achieved, the mold gate vestige on the molded part may be damaged and considered cosmetically undesirable.

BRIEF SUMMARY OF THE INVENTION

Embodiments hereof are directed to a hot runner apparatus having a valve gated nozzle tip with a thermal transition region between the tip and the mold gate.

BRIEF DESCRIPTION OF THE FIGURES

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The figures may not be to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
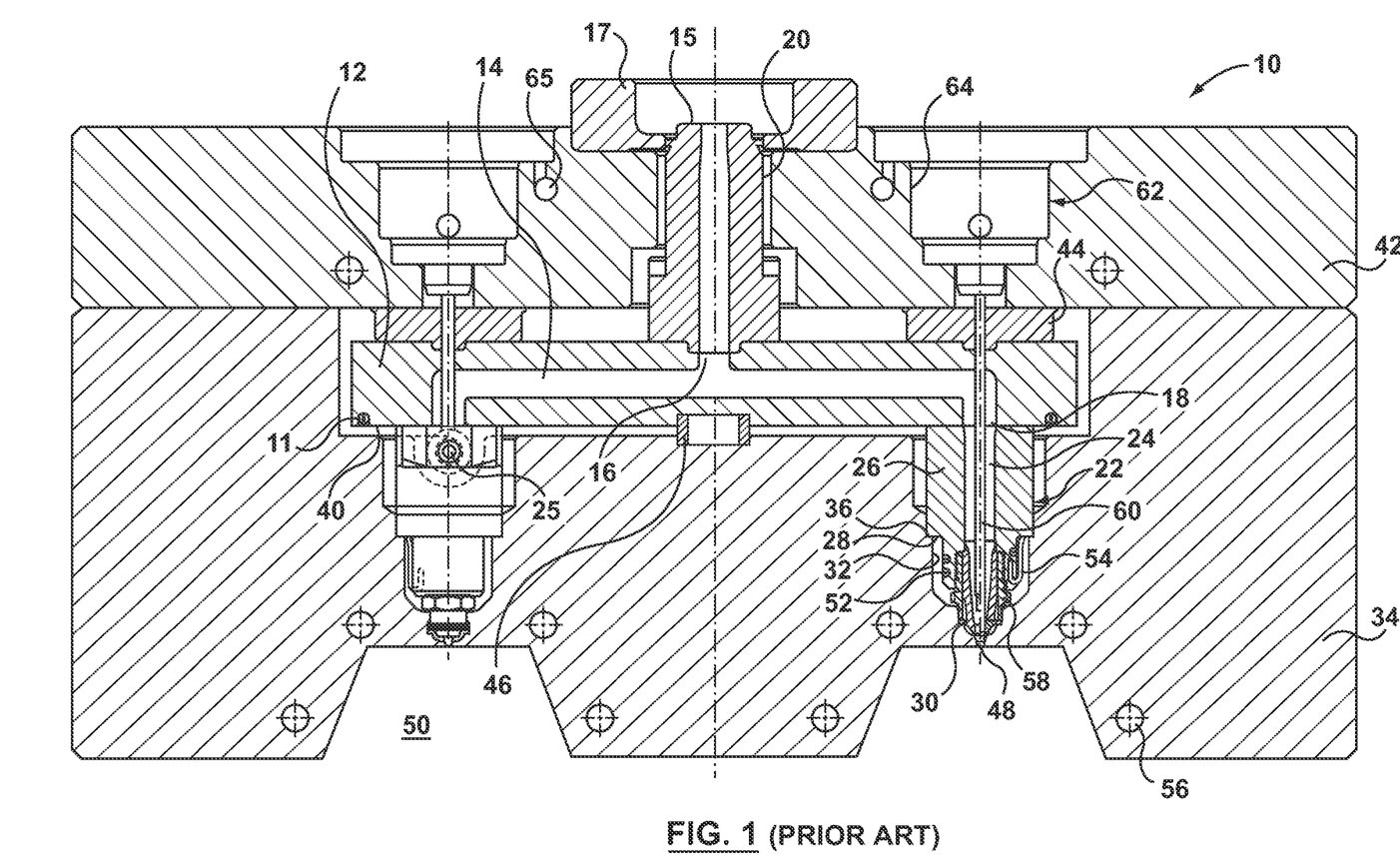
FIG. 1 is a partial sectional view of a prior art injection molding apparatus.

Embodiments hereof relate to, among other things, nozzles and components which can be used in injection molding apparatus such as the injection molding apparatus 10 shown in FIG. 1. Injection molding apparatus 10 includes a manifold 12 having a manifold melt channel 14 and a manifold heater 11. Manifold melt channel 14 extends from a manifold inlet portion 16 to manifold outlets 18. Manifold heater 11 can be of any design such as the insulated resistance wire illustrated. Manifold inlet portion 16 of manifold melt channel 14 receives a melt stream of moldable material from an injection molding machine nozzle (not shown) through an inlet extension 20 and delivers the melt to nozzles 22, which are in fluid communication with respective manifold outlets 18. Inlet extension 20 includes an upstream surface 15 for engaging inlet extension 20 with the injection molding machine nozzle (not shown). Inlet extension 20 may also include an inlet extension heater (not shown) similar to but not limited to the resistance wire heater shown in manifold heater 11. It will be appreciated by one of ordinary skill in the art that inlet extension 20 can also be called a sprue or a sprue bushing. Nozzles 22 in combination with manifold 12 may be referred to as a hot runner system. Although one manifold 12 and two nozzles 22 are shown in FIG. 1, it will be appreciated by one of ordinary skill in the art that a typical injection molding apparatus may include only one or a plurality of nozzles for receiving melt from respective manifold outlets. It will also be appreciated by one of ordinary skill in the art that a typical injection molding apparatus may also include a plurality of manifolds, bridge manifolds and/or accompanying components for delivering melt from a central inlet component to the nozzles. The injection molding apparatus can also include additional components such as mold plates, alignment dowels, bolts, lifting holes, among others without departing from the scope hereof.

Each nozzle 22 is received in an opening 32 in a mold plate 34, although only one mold plate is shown, mold plate 34 may include a plurality of plates for assembly and manufacturing purposes. A nozzle head 26 of nozzle 22 includes a downstream surface 28. Downstream surface 28 abuts a shoulder 36 of mold plate 34 that is provided to center nozzle 22 in opening 32 and to maintain nozzle head 26 in abutment with a downstream surface 40 of manifold 12. Opening 32 also insulates nozzle 22 from mold plate 34. A nozzle tip 30 is received in a downstream end of nozzle 22. Nozzle tip 30 may be of a unitary or component structure. Nozzle tip 30 is coupled to nozzle 22 by a tip retainer 58. Tip retainer 58 is threaded to nozzle 22, however it could also be fixed to nozzle 22 by any other means known in the art, for example brazed, soldered, or by a press/shrink fit. A nozzle melt channel 24 extends through nozzle 22 and nozzle tip 30. Nozzle melt channel 24 is in fluid communication with manifold outlet 18 to receive melt from manifold channel 14. Nozzle 22 is heated by a nozzle heater 52 and further includes a thermocouple 54 for monitoring the temperature of nozzle 22. Nozzle heater 52 can be of any design such as the insulated resistance wire illustrated. Nozzle 22 further includes a terminal end 25 for connecting nozzle heater 52 to a power source (not shown).

A valve pin 60 extends from actuator 62 to mold gate 48 through nozzle melt channel 24 and is slidable through a valve pin bushing 44, which is provided as a supporting member between manifold 12 and a back plate 42. In operation valve pin bushing 44 coaxially aligns valve pin 60 with nozzle 22 and mold gate 48. Back plate 42 includes a locating ring 17 for aligning injection molding apparatus 10 on an injection molding machine stationary platen (not shown). Valve pin 60 is axially movable by actuator 62 to open and close mold gate 48. Actuator 62 is received in an opening 64 in back plate 42. If actuator 62 depends on a working fluid for operation, i.e., pneumatic or hydraulic types, fluid conduits 65 can be provided in back plate 42. Should actuator 62 be electric, magnetic, or of some other design, electrical conduits (not shown) can be provided. A manifold locator 46 maintains manifold 12 in position relative to mold plate 34.

Mold cavities 50 are provided between mold plate 34 and a mold core (not shown). Each mold cavity 50 receives melt from a respective nozzle melt channel 24 through a respective mold gate 48. Cooling channels 56 extend through mold plate 34 to cool mold cavities 50. In operation, melt is injected from an injection molding machine nozzle (not shown) into manifold channel 14 of manifold 12 though inlet extension 20. Nozzle melt channels 24 of nozzles 22 receive melt from manifold outlets 18 and deliver the melt to respective mold cavities 50 through respective mold gates 48. Once mold cavities 50 have been filled with melt, the melt is cooled and the molded parts are ejected from injection molding apparatus 10.

An embodiment hereof that may be adapted for use in the injection molding apparatus of FIG. 1 will now be described with reference to FIGS. 2-4. Nozzle 122 is received in an opening 132 in mold plates 134a and 134b. Although two plates are shown to form opening 132 fewer or more plates may be used. Nozzle 122 has a flange 126, which is similar to nozzle head 26 shown in FIG. 1, that supports nozzle 122 against a manifold (not shown). Nozzle 122 is heated by a nozzle heater 152 and further includes a thermocouple 154 for monitoring the temperature of nozzle 122. Although nozzle heater 152 is shown as an embedded insulated resistance wire, in further embodiments any nozzle heater known in the art may be used without departing from the scope of the present invention.

Figure 5:
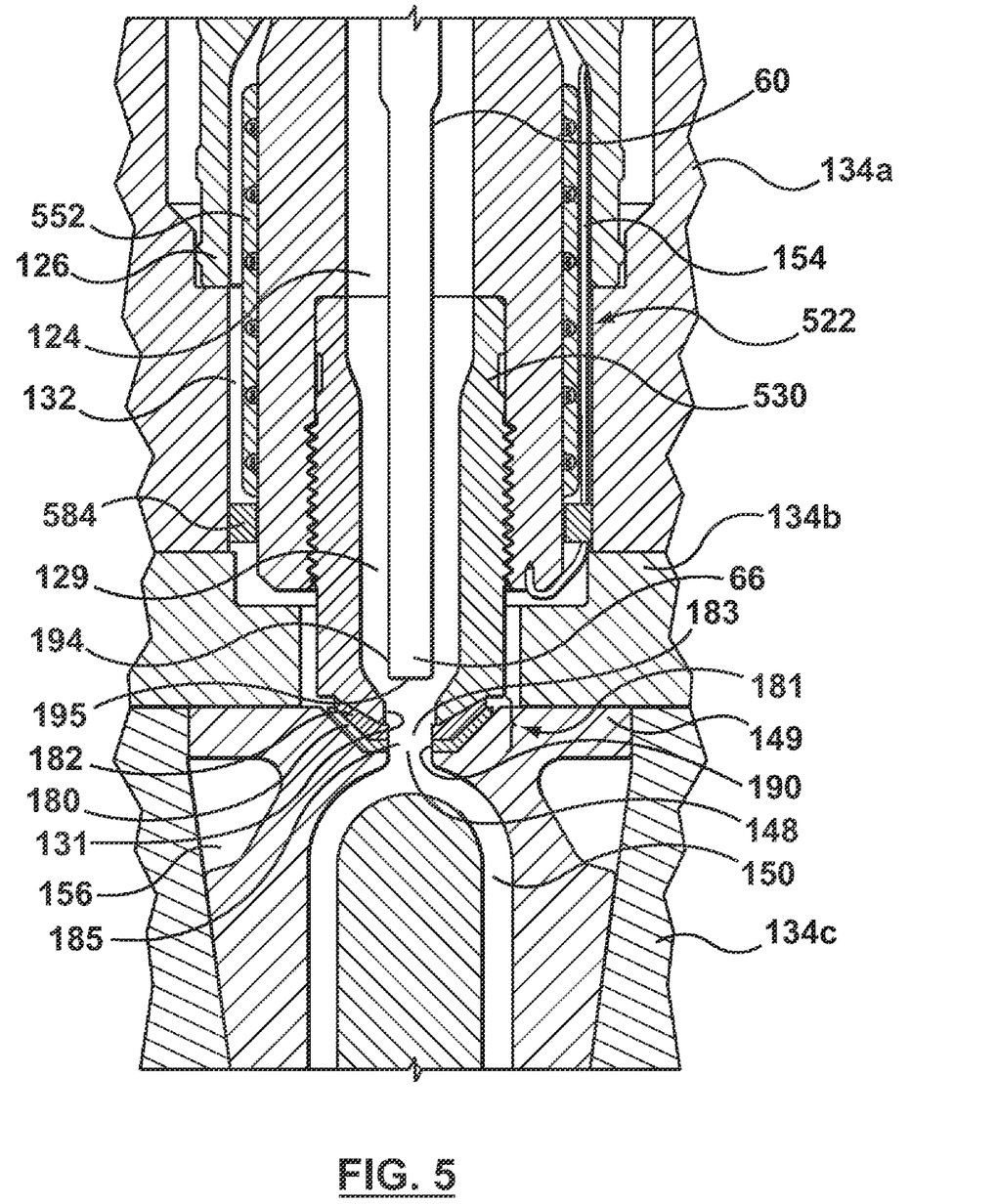
FIG. 5 is a sectional view of a portion of an injection molding system in accordance with another embodiment hereof with an alternative nozzle tip and an alternative heater configuration.

Nozzle tip 130 is coupled to nozzle 122 by a tip retainer 158. Nozzle tip 130 is of a thermally conductive material that conducts heat from heated nozzle 122 towards a mold gate 148 in a mold gate component 149, whereas tip retainer 158 is of a more insulative material to prevent heat loss to mold plate 134b. A gap 188 provided between nozzle tip 130 and tip retainer 158 reduces contact and heat transfer therebetween; this feature is optional and may be omitted. It will be appreciated by one of ordinary skill in the art that nozzle tip 130 and tip retainer 158 may be held together by a slide fit, an interference fit, a press/shrink fit, threads, or any other type of engagement. Tip retainer 158 is threaded to nozzle 122, however it could also be fixed to nozzle 122 by any other means known in the art, for example brazed, soldered, or by a press/shrink fit. Tip retainer 158 has a mold contacting portion 184 which aligns nozzle tip 130 with mold gate 148. The embodiment in FIG. 2 shows nozzle tip 130 coupled to nozzle 122 by a separate tip retainer 158. In an alternate embodiment, as shown in FIG. 5, a nozzle tip 530 may be coupled directly to the nozzle 522. Although threads are shown connecting nozzle tip 530 to nozzle 522 connection between nozzle tip 530 and nozzle 522 can be by any means known in the art, for example: threaded, brazed, soldered, or by a press/shrink fit. Without the use of a separate tip retainer, mold contacting portion 584 is a separate annular piece positioned between nozzle 522 and mold plate 134a for aligning nozzle tip 530 with mold gate 148. FIG. 5 also depicts nozzle 522 as being heated by a band heater 552.

Figure 2:
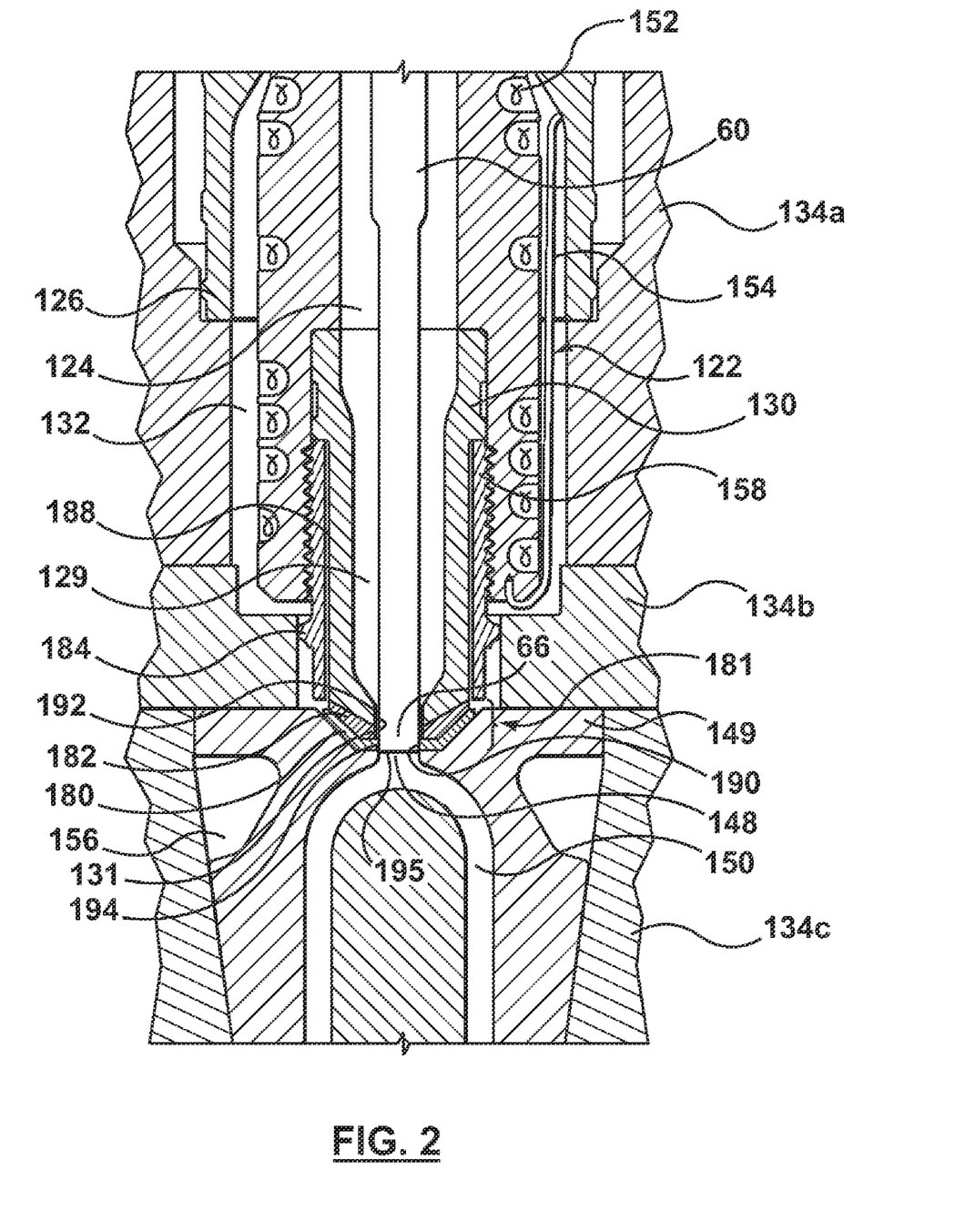
FIG. 2 is a sectional view of a portion of an injection molding apparatus in accordance with an embodiment hereof shown with a valve pin seated within a mold gate in a closed position.

As first shown in FIG. 2, a first transition member 182 and a second transition member 180 provide a thermal transition region 181 between nozzle tip 130 and mold gate component 149. Referring to FIG. 4, first transition member 182 is saucer shaped and has an upstream surface 170 in contact with a downstream end 172 of nozzle tip 130. Second transition member 180 is saucer shaped and has an upstream surface 174 in contact with a downstream surface 176 of first transition member 182 and a downstream surface 178 in contact with mold gate component 149. Each of the first and second transition members 182, 180 includes a respective melt channel 183, 185. When valve pin 60 is in the open position as shown in FIG. 3, melt travels through nozzle melt channel 124 into the tip melt channel 129, through nozzle tip outlet 131, first transition member melt channel 183, second transition member melt channel 185, mold gate 148, and then finally into mold cavity 150.

Figure 3:
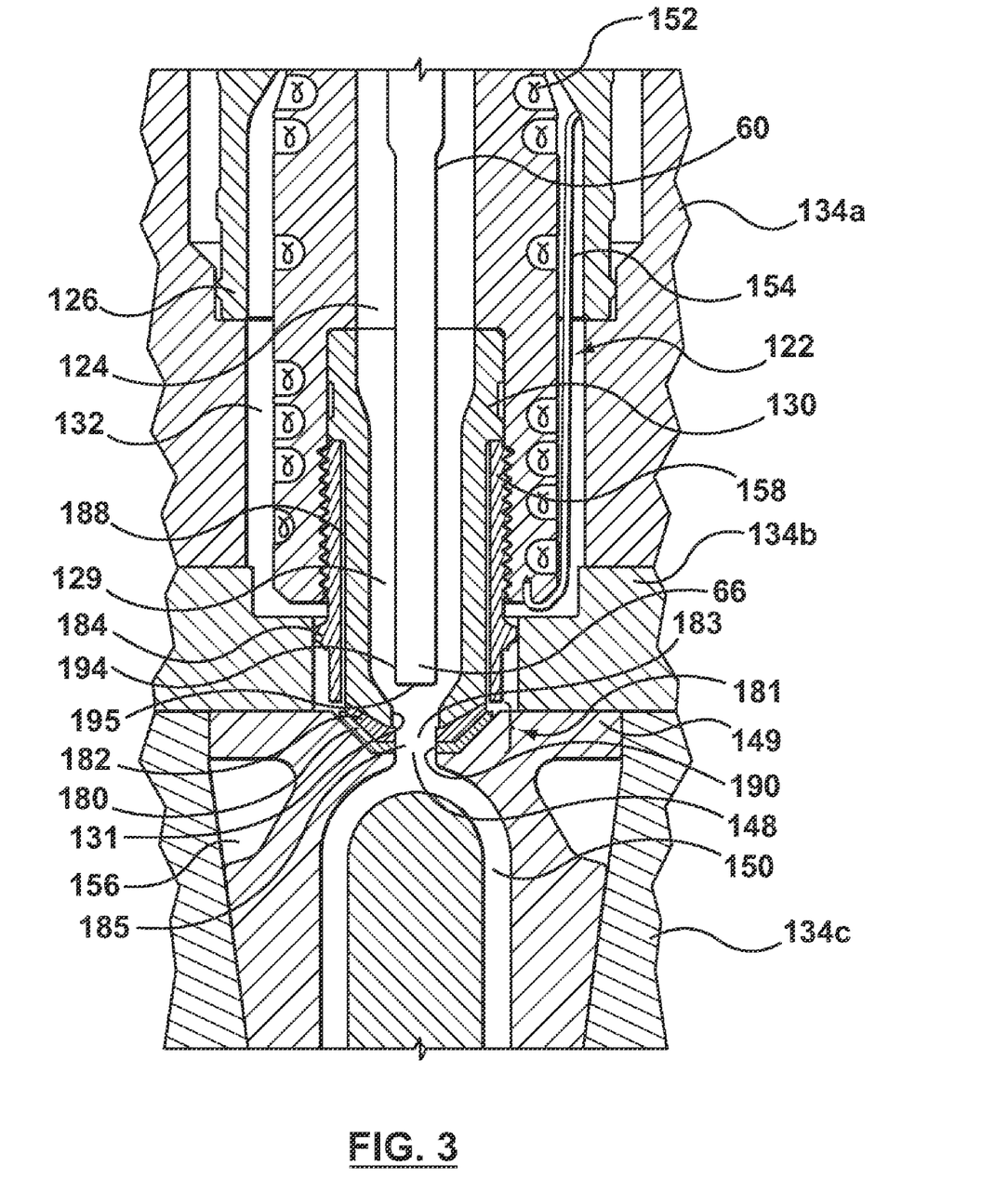
FIG. 3 is the injection molding system of FIG. 2 shown with the valve pin unseated from the mold gate in an open position.
Figure 4:
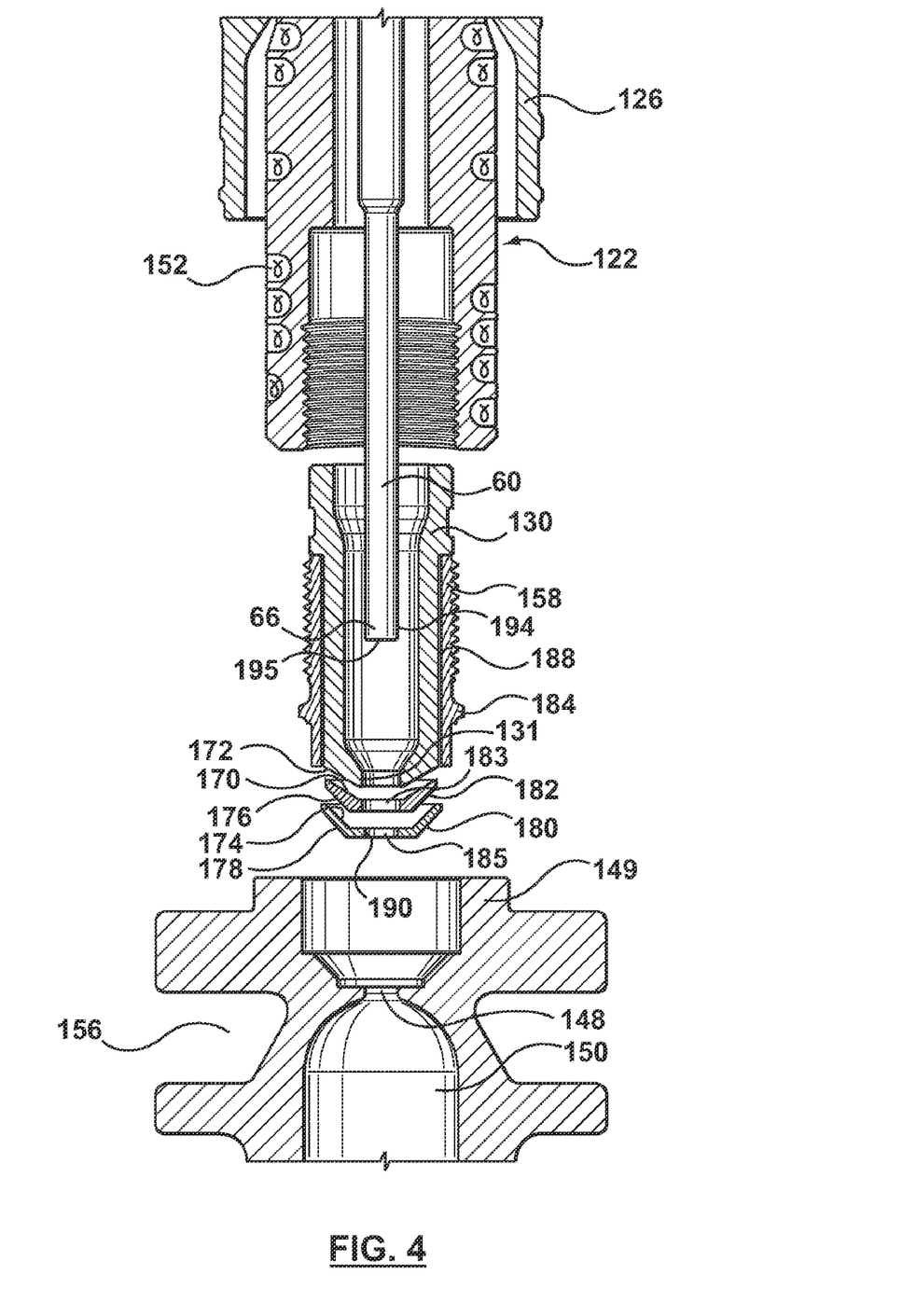
FIG. 4 is an exploded sectional view of a portion of the injection molding system of FIG. 2.

Mold gate 148 is located in mold gate component 149, which in FIGS. 2-5 is shown as an individual mold gate component 149. It will be appreciated by one of ordinary skill in the art that mold gate component 149 can also be referred to as a mold gate insert. As shown in FIGS. 2, 3 and 5, mold gate component 149 is inserted into mold plate 134c and has mold cooling channels 156, which provide cooling to mold cavity 150 and mold gate 148. Instead of a separate mold gate component 149, a mold gate formed in a mold plate, such as a mold cavity plate, in an arrangement similar to that shown in FIG. 1 may be considered a mold gate component adapted for use in embodiment hereof.

As mentioned above, first transition member 182 and second transition member 180 provide a thermal transition region 181 between nozzle tip 130 and mold gate component 149. First transition member 182 is made from a low thermally conductive material; which is a material with a thermal conductivity of less than 15 W/m*K measured at room temperature. Materials with such thermal conductivities are generally considered to be of a low thermal conductivity or insulative in the injection molding industry. A material with low thermal conductivity is used to reduce heat loss from nozzle tip 130 to mold gate component 149. Some examples of suitable materials for use in making first transition member 182 include but are not limited to: a high temperature polymer alloy, for example a polyimide (VESPEL, PLAVIS), a ceramic, or titanium or titanium alloy.

In FIG. 2 valve pin 60 is shown seated within mold gate 148 in a closed position blocking the flow of melt through mold gate 148 into mold cavity 150. In the closed position the end portion 66 of valve pin 60 has a circumferential outer surface 194 that is in sealing contact with a sealing surface 190 of second transition member 180. A gap 192 is shown between outer surface 194 of valve pin 60 and both nozzle tip 130 and first transition member 182. Gap 192 insulates valve pin 60 from nozzle tip 130 and prevents wear of first transition member 182. In alternate embodiments, a gap may not be utilized such that the valve pin also contacts a wall of at least one of the nozzle tip outlet and a wall of the melt channel of the first transition member. Contact between valve pin end portion 66 and second transition member 180 when valve pin 60 is in the closed position transfers cooling from mold gate component 149 through sealing surface 190 of second transition member 180 to circumferential outer surface 194 of end portion 66 of valve pin 60. As such, the temperature of the downstream face 195 of valve pin 60, which makes contact with the melt in mold gate 148, is reduced to thereby subsequently reduce the cooling time necessary to solidify the melt in mold cavity 150.

To facilitate the transfer of cooling from mold gate component 149 to valve pin 60, second transition member 180 is made from a material which is more thermally conductive than the material of mold gate component 149, as well as more thermally conductive than the material of first transition member 182. In an embodiment, second transition member 180 is made from a high or very high thermally conductive material; a material with a thermal conductivity above 100 W/m*K measured at room temperature. Some examples of suitable materials for use in making second transition member 180 include but are not limited to: copper and copper alloys, for example beryllium copper (MOLDMAX beryllium copper alloys, C17000 alloys) and beryllium free copper (AMPCO 940, C18000), aluminum and aluminum alloys, molybdenum and molybdenum alloys (TZM).

Sealing surface 190 of second transition member 180 also guides and aligns valve pin 60 with mold gate 148 as the valve pin is actuated between open and closed positions, and thus sealing surface 190 of second transition member 180 is subject to wear over time. In some applications, thermal conductivity of second transition member 180 may be less important than other properties of second transition member 180, for example wear resistance or strength. In such applications, embodiments of second transition member 180 may be of a moderately conductive material. Such materials have thermal conductivities generally between 15 W/m*K and 99 W/m*K measured at room temperature. Some suitable materials for use in making a moderately conductive yet wear resistant second transition member 180 include but are not limited to: carbide and tungsten carbide alloys, mold steel, and stainless steels. Tungsten carbide alloys typically used in the injection molding industry generally have a thermal conductivity range of 60-80 W/m*K, and possesses beneficial wear resistant properties.

In embodiments hereof, nozzle tip 130 is made from a material with a thermal conductivity that is moderate, high or very high as described above for second transition member 180. Mold gate component 149 is made from mold steel or stainless steel, which is in the moderately thermally conductive category. In selecting a material for second transition member 180, the material should have a higher thermal conductivity than mold gate component 149. As noted above, tip retainer 158 is in contact with mold plate 134b at mold contacting portion 184, such that tip retainer 158 is made from a material having low thermal conductivity, for example a titanium alloy, to prevent heat transfer between nozzle 122 and mold plate 134b. In an embodiment where thermal insulation is less of a concern, the tip retainer may be made of steel.

Installation of first and second transition members 182, 180 into a hot runner injection molding apparatus depends on the materials of individual components, application temperatures, and space provided in the mold. In an embodiment, first transition member 182 may be fixed to nozzle tip 130 and second transition member 180 may be fixed to first transition member 182. In other embodiments, second transition member 180 may be fixed to mold gate component 149, and first transition member 182 is fixed to either second transition member 180 or to nozzle tip 130. Fixing may be by adhesive, brazing, soldering or any other means known in the art that is appropriate for the materials and operating temperatures expected. In other embodiments, the first and second transition members 182, 180 may be shaped or formed so that they can be interference fit, shrink/press fit or threaded onto nozzle tip 130, mold gate component 149 and/or to each other as shown in the embodiments of FIGS. 6A, 6B, and 6C.

Figure 6A:
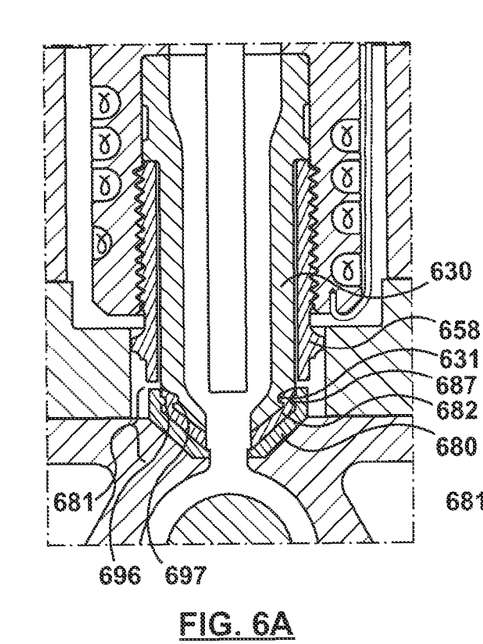
FIG. 6A is a sectional view of a portion of an injection molding system in accordance with another embodiment hereof in which a nozzle tip, a first transition member and a second transition member are shown coupled together in an interference fit arrangement.

FIG. 6A shows an embodiment similar to that of FIGS. 2-4 except as described below. Features and aspects of the other embodiments can be used with the present embodiment. The difference between the embodiment of FIG. 6A and the preceding embodiments is the connection between nozzle tip 630, first transition member 682, and second transition member 680, which changes the dimensions of thermal transition region 681 but otherwise the components function similarly to the previous embodiments. Nozzle tip 630 contains a groove 631 in an outer surface thereof that is positioned downstream from tip retainer 658. First transition member 682 contains a protrusion 697 complimentary to groove 631 in nozzle tip 630 for creating an interference fit between the two components. First transition member 682 also contains a groove 687 on an outer surface radially opposed to protrusion 697. Second transition member 680 contains a protrusion 696 complimentary to groove 687 in first transition member 682 for creating an interference fit between the two components. The interference fits between nozzle tip 630 and first transition member 682, and between first transition member 682 and second transition member 680 creates a coupling between the three components.

Figure 6B:
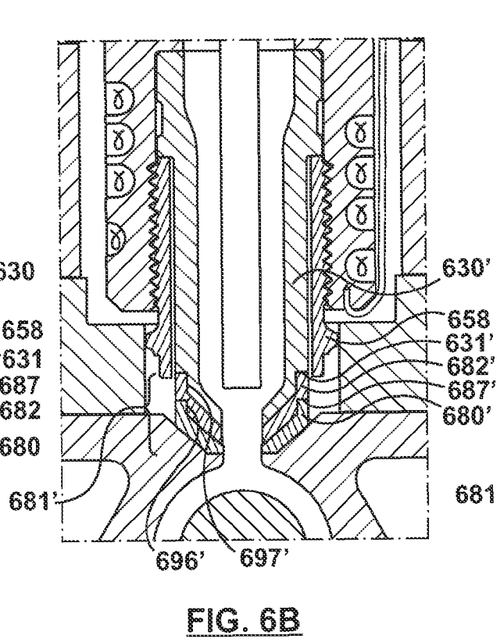
FIG. 6B is a sectional view of a portion of an injection molding system in accordance with another embodiment hereof in which a nozzle tip, a first transition member and a second transition member are shown coupled together in a press fit arrangement.

FIG. 6B shows an embodiment similar to that of FIGS. 2-4 except as described below. Features and aspects of the other embodiments can be used with the present embodiment. The difference between the embodiment of FIG. 6B and the preceding embodiments is the connection between nozzle tip 630', first transition member 682', and second transition member 680', which changes the dimensions of thermal transition region 681' but otherwise the components function similarly to the previous embodiments. Nozzle tip 630' contains a shoulder 631' in an outer surface thereof positioned downstream from tip retainer 658. First transition member 682' contains a bore 697' complimentary to shoulder 631' in tip 630' for creating a shrink/press fit between the two components. First transition member 682' also contains a shoulder 687' on an outer surface thereof. Second transition member 680' contains a bore 696' complimentary to shoulder 681' in first transition member 682' for creating a shrink/press fit between the two components. The shrink/press fits between nozzle tip 630' and first transition member 682', and between first transition member 682' and second transition member 680' creates a coupling between the three components.

Figure 6C:
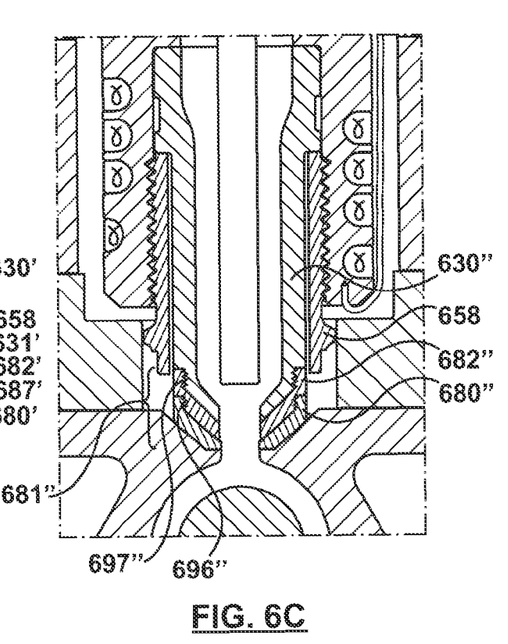
FIG. 6C is a sectional view of a portion of an injection molding system in accordance with another embodiment hereof in which a nozzle tip, a first transition member and a second transition member are shown coupled together in a threaded arrangement.

FIG. 6C shows an embodiment similar to that of FIGS. 2-4 except as described below. Features and aspects of the other embodiments can be used with the present embodiment. The difference between the embodiment of FIG. 6C and the preceding embodiments is the connection between nozzle tip 630", first transition member 682", and second transition member 680", which changes the dimensions of thermal transition region 681" but otherwise the components function similarly to the previous embodiments. Nozzle tip 630" contains threads in an outer surface thereof located downstream from tip retainer 658. First transition member 682" contains complimentary threads to the threads of nozzle tip 630" such that nozzle tip 630" and first transition member 682" are joined by a threaded connection 697". First transition member 682' also contains threads on an outer surface thereof. Second transition member 680" contains threads complimentary to the threads of first transition member 682" such that second transition member 680" and first transition member 682" are joined by a threaded connection 696". The threaded engagement between nozzle tip 630" and first transition member 682" and between first transition member 682" and second transition member 680" creates a coupling between the three components.

Figure 7:
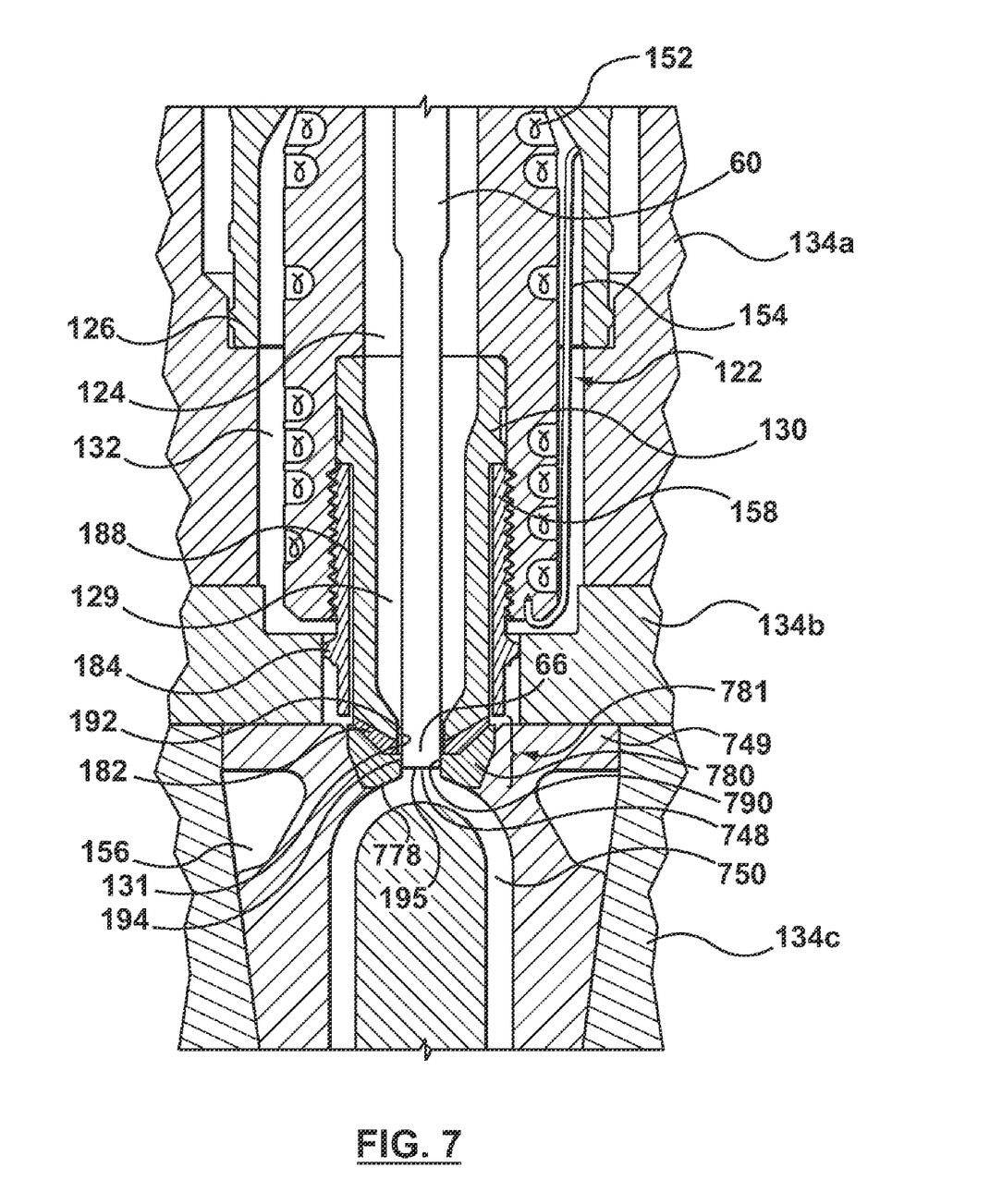
FIG. 7 is a sectional view of a portion of an injection molding system in accordance with another embodiment hereof in which a second transition member is shown forming a portion of a mold cavity.

FIG. 7 shows another embodiment of the present invention similar to that of FIGS. 2-4 except as described below. Features and aspects of the other embodiments can be used with the present embodiment. In FIG. 7 second transition member 780 has a downstream surface 778 that forms mold gate 748 and a portion of mold cavity 750. First transition member 782 and second transition member 780 provide a thermal transition region 781 between tip retainer 158 and nozzle tip 130, and mold gate component 149 and mold cavity 750.

In this embodiment valve pin 60 is shown seated within mold gate 748 in a closed position blocking the flow of melt through mold gate 748 into mold cavity 750. End portion 66 of valve pin 60 has a circumferential outer surface 194 that is in sealing contact with a sealing surface 790 of second transition member 780. Contact between valve pin end portion 66 and second transition member 780 when valve pin 60 is in the closed position transfers cooling from mold gate component 749 through sealing surface 790 of second transition member 780 to circumferential outer surface 194 of end portion 66 of valve pin 60. Second transition member 780 also transfers cooling from mold gate component 749 to mold gate 748 and to a portion of mold cavity 750. As such, the temperature of downstream face 195 of valve pin 60 in contact with the melt in mold gate 748 as well as the temperature of mold gate 748 and the portion of mold cavity 750 formed by second transition member 780 are reduced, which subsequently reduces the cooling time necessary to solidify the melt in mold cavity 750.

Figure 8:
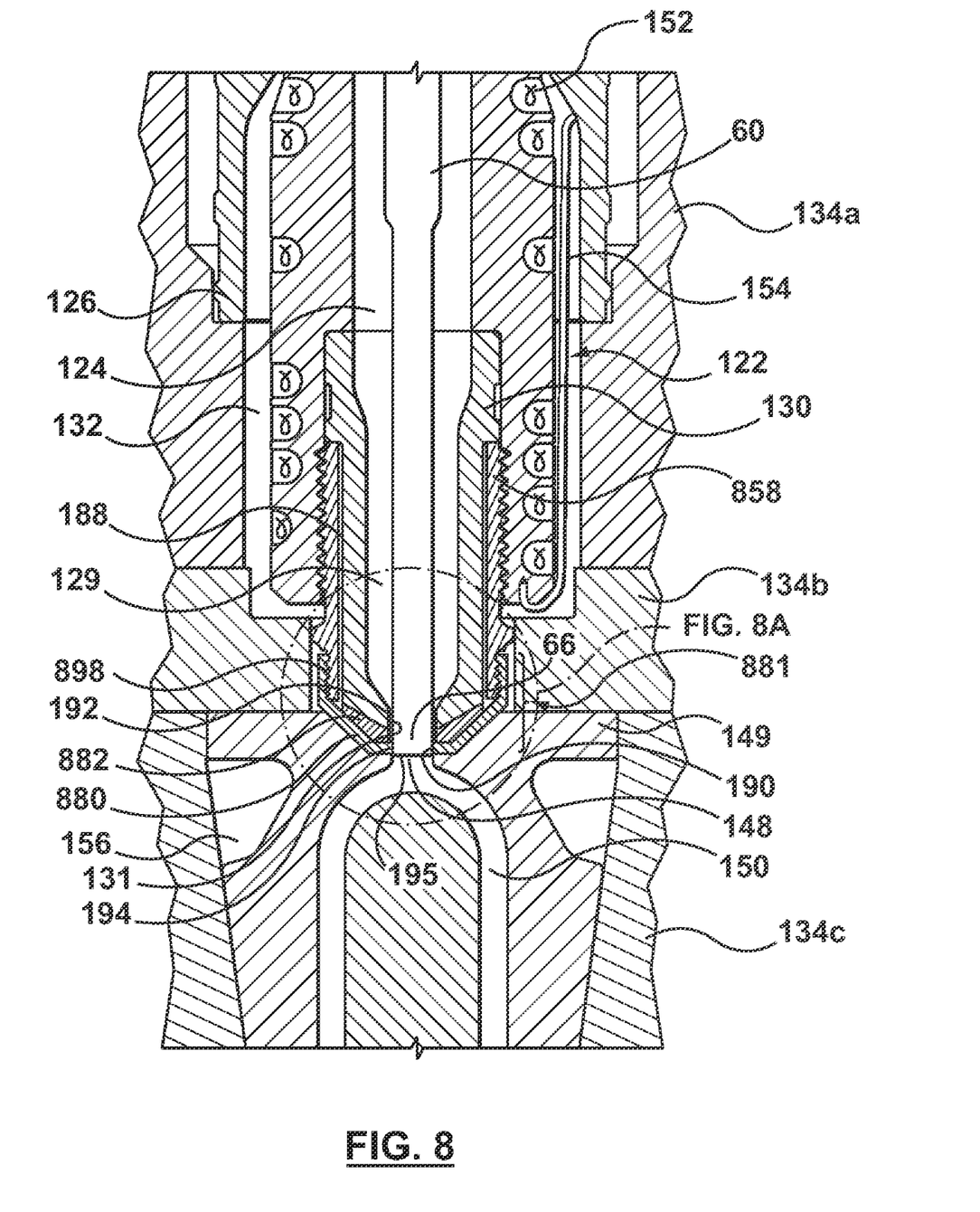
FIG. 8 is a sectional view of a portion of an injection molding system in accordance with another embodiment hereof in which a second transition member is shown connected to a tip retainer.

FIG. 8 shows another embodiment of the present invention. Features and aspects of the other embodiments can be used with the present embodiment. FIG. 8 illustrates a portion of a nozzle 122 with nozzle melt channel 124 in fluid communication with nozzle tip 130 and valve pin 60 similar to the previous embodiments. In this embodiment nozzle tip 130 is coupled to nozzle 122 by a tip retainer 858. Tip retainer 858 is threaded to nozzle 122, however it could also be fixed to nozzle 122 by any other means known in the art, for example brazed, soldered, or by a press/shrink fit. A first transition member 882 is located at the downstream end of nozzle tip 130, and is sandwiched between nozzle tip 130 and a second transition member 880. In FIG. 8 second transition member 880 is coupled to tip retainer 858 by complimenting threads 898, however it will be appreciated by one skilled in the art that second transition member 880 and tip retainer 858 can be coupled together by any means known in the art, for example: threaded, brazed, soldered, or by a press/shrink fit. First transition member 882 and second transition member 880 provide a thermal transition region 881 between tip retainer 858 and nozzle tip 130 and mold gate component 149.

Figure 8A:
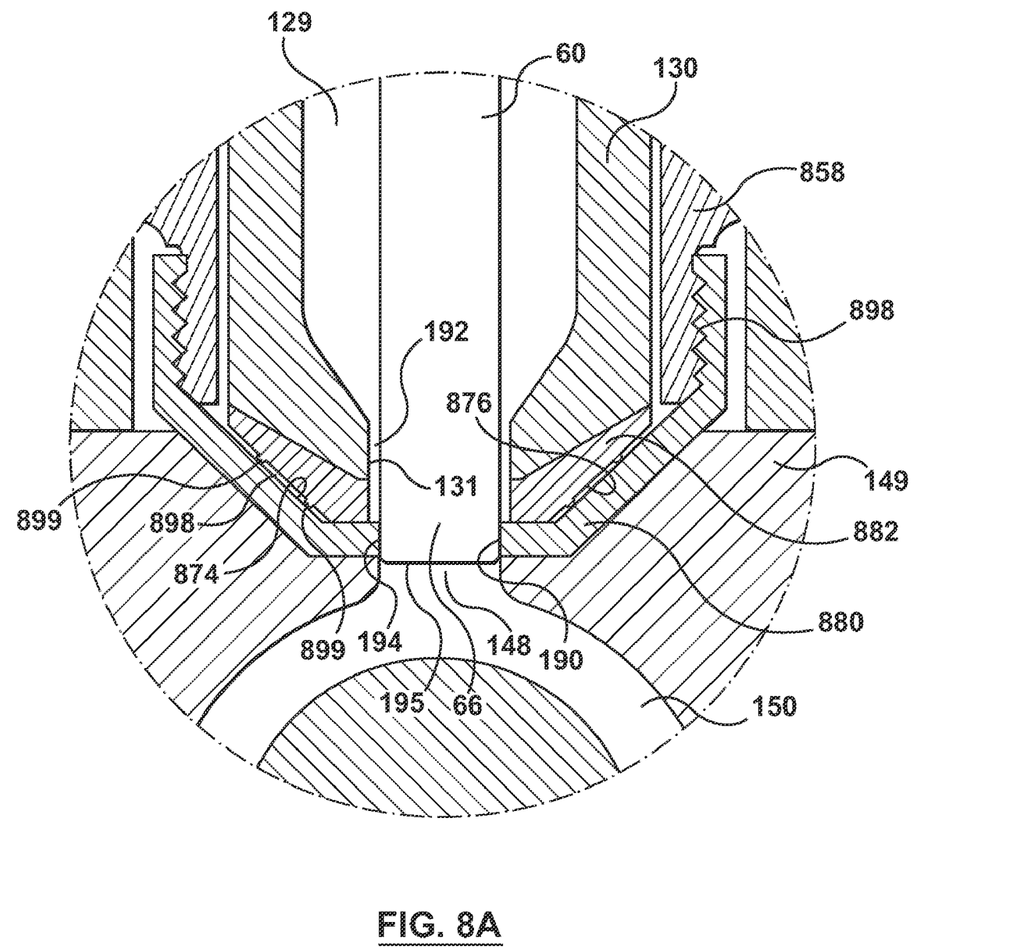
FIG. 8A is an enlarged view of a portion of the injection molding system shown in FIG. 8 showing reduced contact between a first transition member and a second transition member.

In previous embodiments, the downstream surface 176 of first transition member 182 makes substantially full contact with the upstream surface 174 of second transition member 180. An enlarged view of a gate portion of FIG. 8 is shown in FIG. 8A. In the present embodiment, the downstream surface 876 of first transition member 882 contains two annular protrusions 899 in contact with the upstream surface 874 of the second transition member 880. In other embodiments, one or more annular protrusions may extend from downstream surface 876 of first transition member 882, from upstream surface 874 of second transition member 880 or from each of downstream surface 876 and upstream surface 874. Annular protrusions 899 reduce contact between upstream surface 874 of second transition member 880 and downstream surface 876 of first transition member 882 and create an insulative gap 898 between first transition member 882 and second transition member 880. In various other embodiments, insulative gap 898 between first transition member 882 and second transition member 880 may be created by adding one or more annular grooves (not shown) to downstream surface 876 of first transition member 882 or to upstream surface 874 of the second transition member 880, or by having one or more grooves within each of downstream surface 876 of first insulative member 882 and upstream surface 874 of second transition member 880. Annular protrusions 899 or grooves (not shown) do not have to be complete annular or circular grooves, and may be comprised of any number of segments.

Although only two transition members are shown in each of the aforementioned embodiments, it is contemplated that additional transition members with different thermal conductivities may be added to alter the size of thermal transition region 181, or to refine the thermal transition properties between nozzle tip 130, first and second transition members 182 and 180 respectively, and mold gate component 149 as described above without departing from the scope of the present invention.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An injection molding apparatus comprising:
   an injection molding nozzle having a heater and a melt channel for receiving melt from a melt source;
   a nozzle tip coupled to a downstream end of the nozzle, the nozzle tip having a melt channel for receiving melt from the nozzle melt channel;

a cooled mold gate component having a mold gate which is in fluid communication with the nozzle tip melt channel for transferring melt from the nozzle to a mold cavity;

a valve pin longitudinally extending within the melt channels of the nozzle and nozzle tip, the valve pin being selectively actuated between an open position that allows melt flow through the mold gate into the mold cavity and a closed position that blocks melt flow from entering the mold gate and the mold cavity;

a first transition member having a melt channel, the first transition member being in contact with a downstream end of the nozzle tip; and a second transition member having a melt channel, the second transition member being positioned downstream of the first transition member in contact with an upstream surface of the mold gate component, wherein the first transition member and the mold gate component are made from materials which are less thermally conductive than a material of the second transition member, and wherein in the closed position an end portion of the valve pin makes contact with the second transition member.

2. The injection molding apparatus of claim 1, wherein in the closed position the end portion of the valve pin seals against a sealing surface of the melt channel of the second transition member to block melt flow from entering the mold gate.

3. The injection molding apparatus of claim 2, wherein the nozzle tip and the first transition member are spaced from the valve pin by a gap when the valve pin is in the closed position.

4. The injection molding apparatus of claim 1, wherein a downstream surface of the first transition member is in contact with an upstream surface of the second transition member.

5. The injection molding apparatus of claim 4, wherein one of the downstream surface of the first transition member and the upstream surface of the second transition member includes a protrusion upon which contact is made between the first and second transition members.

6. An injection molding apparatus comprising:
an injection molding nozzle having a heater and a melt channel for receiving melt from a melt source;
a nozzle tip coupled to a downstream end of the nozzle, the nozzle tip having a melt channel for receiving melt from the nozzle melt channel;
a cooled mold gate component having a mold gate which is in fluid communication with the nozzle tip melt channel for transferring melt from the nozzle to a mold cavity;
a valve pin longitudinally extending within the melt channels of the nozzle and nozzle tip, the valve pin being selectively actuated between an open position that allows melt flow through the mold gate into the mold cavity and a closed position that blocks melt flow from entering the mold gate and the mold cavity;
a first transition member having a melt channel, the first transition member being in contact with a downstream end of the nozzle tip; and
a second transition member having a melt channel, the second transition member being positioned downstream of the first transition member in contact with an upstream surface of the mold gate component,
wherein the nozzle tip, the first transition member and the second transition member are attached to each other,
wherein the first transition member and the mold gate component are made from materials which are less thermally conductive than a material of the second transition member, and
wherein in the closed position an end portion of the valve pin makes contact with the second transition member.

7. The injection molding apparatus of claim 6, wherein the first transition member is attached to the nozzle tip by an interference fit and the first transition member is attached to the second transition member by an interference fit.

8. The injection molding apparatus of claim 6, wherein the first transition member is attached to the nozzle tip by one of an adhesive, brazing, and soldering and the first transition member is attached to the second transition member by one of an adhesive, brazing, and soldering.

9. The injection molding apparatus of claim 6, wherein the first transition member is attached to the nozzle tip by a threaded connection and the first transition member is attached to the second transition member by a threaded connection.

10. The injection molding apparatus of claim 6, wherein the first transition member is attached to the nozzle tip by a shrink fit and the first transition member is attached to the second transition member by a shrink fit.

11. The injection molding apparatus of claim 6, wherein the second transition member is attached to the nozzle tip by a threaded connection such that the first transition member is sandwiched therebetween.

12. The injection molding apparatus of claim 1, wherein a downstream surface of the second transition member forms a portion of the mold cavity.

13. The injection molding apparatus of claim 1, wherein when the valve pin is in the open position the melt travels through the nozzle melt channel, the nozzle tip melt channel, the first transition member melt channel, the second transition member melt channel and the mold gate after which the melt then enters the mold cavity.

14. The injection molding apparatus of claim 1, wherein the second transition member is made from a material having a thermal conductivity above 100 W/m*K measured at room temperature.

15. The injection molding apparatus of claim 14, wherein the first transition member is made from a material having a thermal conductivity below 15 W/m*K measured at room temperature.

16. The injection molding apparatus of claim 1, wherein in the closed position contact between the end portion of the valve pin and the second transition member transfers cooling from the mold gate component through the second transition member to the end portion of the valve pin.

17. The injection molding apparatus of claim 1, wherein the first transition member is attached to the nozzle tip and the second transition member is attached to the mold gate component.

18. The injection molding apparatus of claim 1, wherein the mold gate component is a mold gate insert.

19. The injection molding apparatus of claim 1, wherein the mold gate component is a mold plate.

20. The injection molding apparatus of claim 1, wherein the first and second transition members have a saucer shape.

* * * * *